March 5, 1963 J. M. PRATT ETAL 3,080,071
BALE PILING ATTACHMENT FOR TRAVELING BALER
Filed April 4, 1960 3 Sheets-Sheet 1
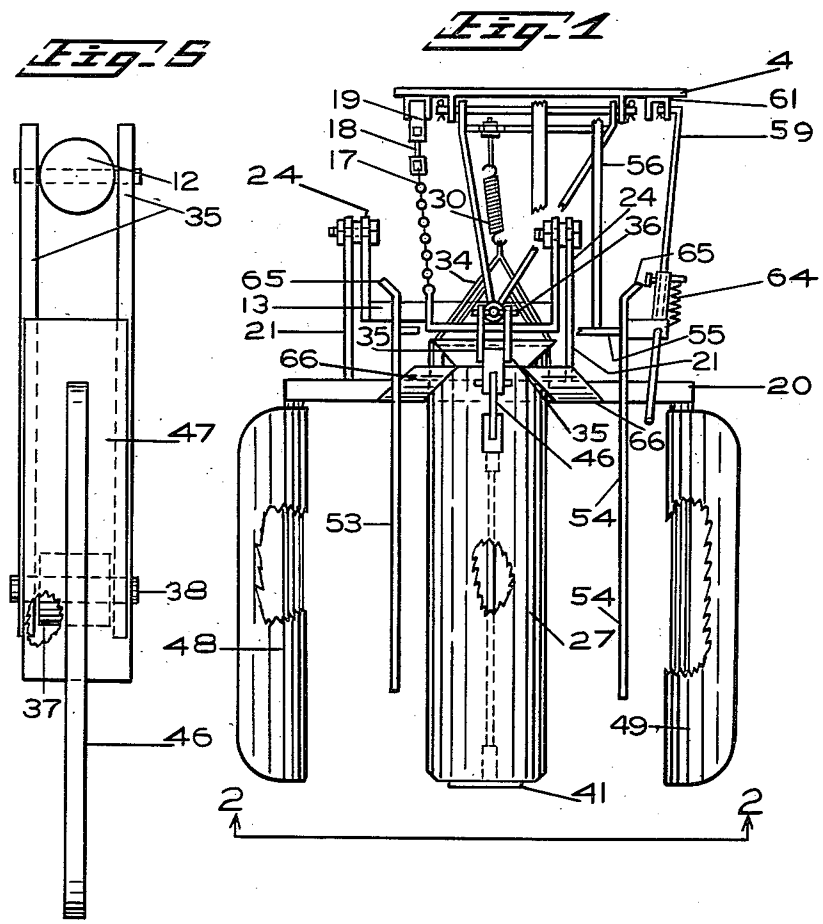
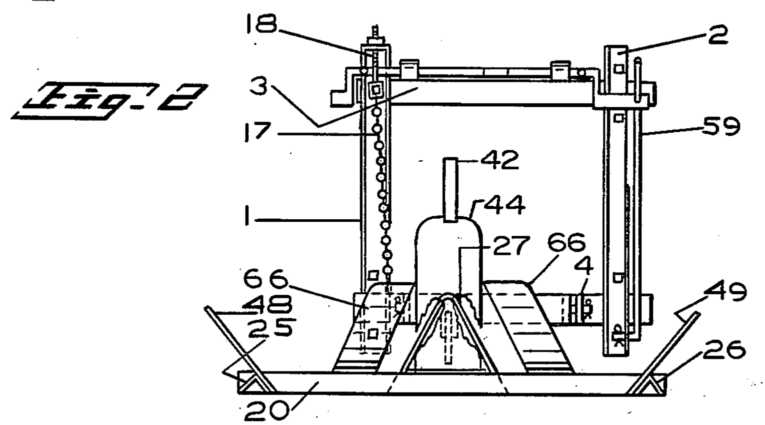

BALE PILING ATTACHMENT FOR TRAVELING BALER
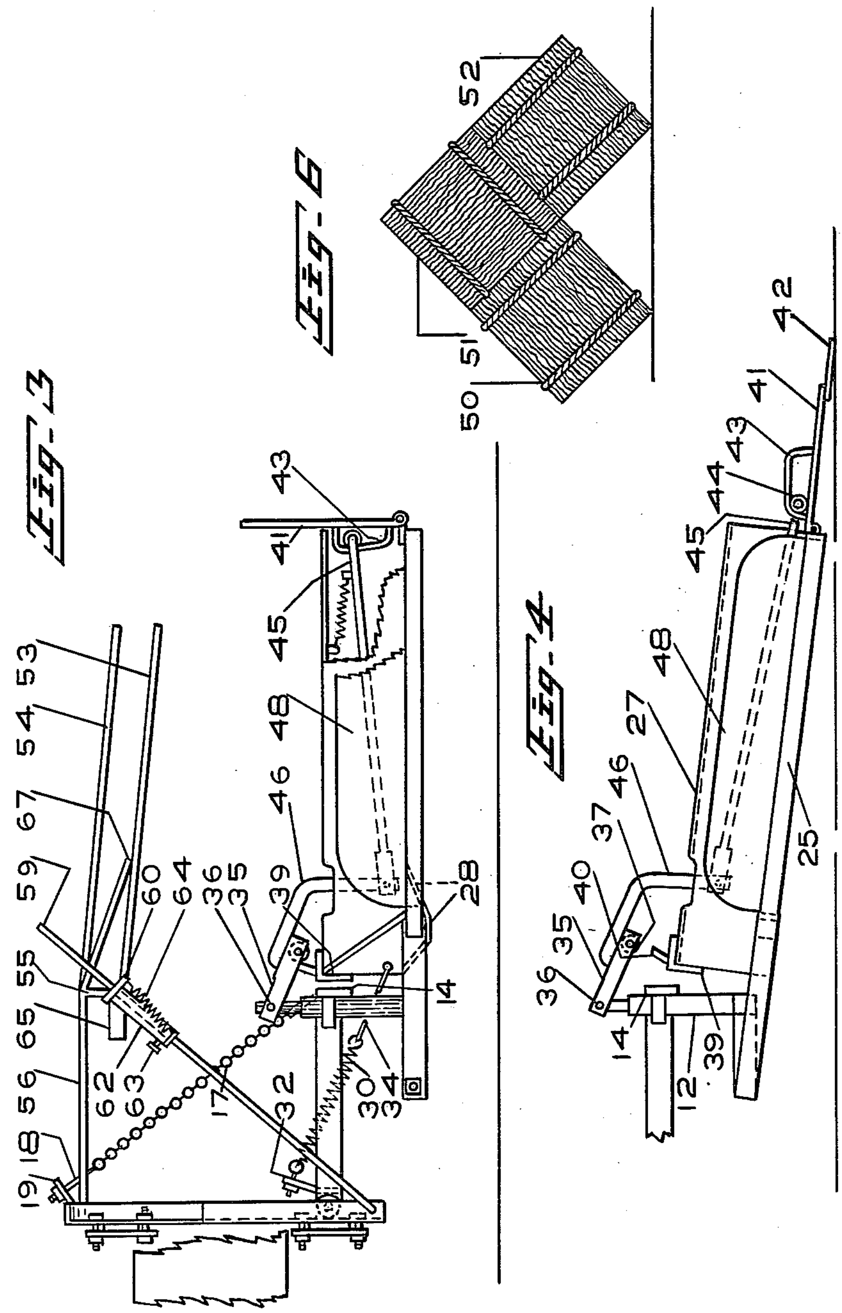

March 5, 1963 J. M. PRATT ET AL 3,080,071
BALE PILING ATTACHMENT FOR TRAVELING BALER
Filed April 4, 1960 3 Sheets-Sheet 3
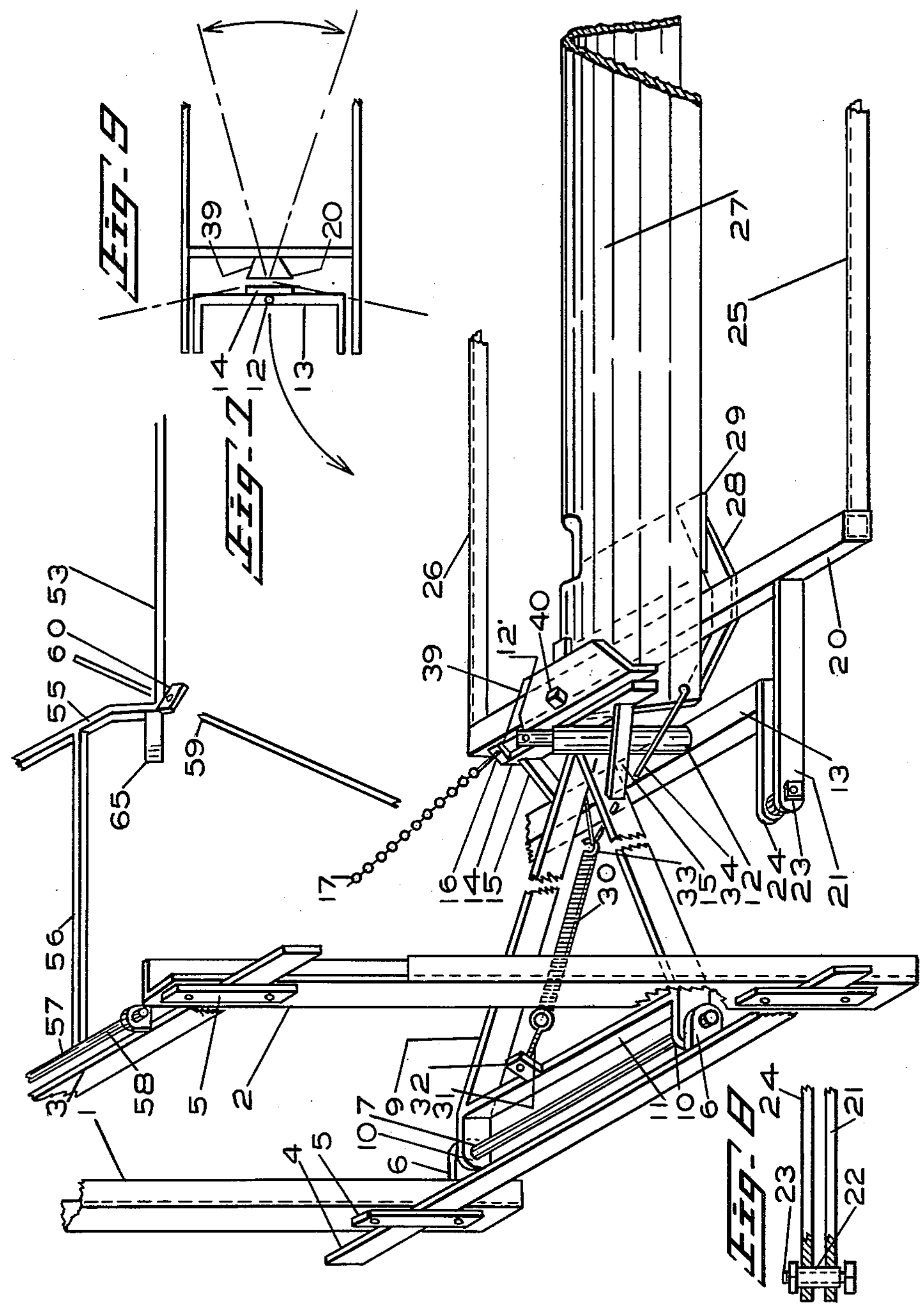

United States Patent Office 3,080,071

Patented Mar. 5, 1963

3,080,071

BALE PILING ATTACHMENT FOR TRAVELING BALER

John Maguire Pratt and Peter Britanius Anderson, both of Southey, Saskatchewan, Canada Filed Apr. 4, 1960, Ser. No. 19,654
3 Claims. (Cl. 214—9)

This invention relates to pile forming attachments for traveling balers by which bales discharged from the baler may be assembled and dropped in a pile on the ground.

In traveling balers used for baling hay or straw the formed bales are discharged from the baler to the ground, and these normally lie with their undersides flat on the ground and their upper sides exposing a horizontal surface to the weather. In wet weather, or if the ground is damp, this results in injury to the bale from mildew through the moisture impregnating the bale and from rot.

The present invention is designed to overcome this by provision of a carrier attachment to be drawn in following relation to the baler and on which the bales are discharged from the baler. The bales are automatically assembled on the carrier with the bales lying edgewise in a pile formed by two bottom bales and a single top bale, and when the pile is complete it is automatically discharged from the carrier on to the ground with the pile remaining intact. The discharged bales lie with the two lower bales supported by lengthwise edges, and all the bales lie with their long sides exposed to the weather slanting at an angle in relation to the ground for shedding moisture.

In the accompanying drawings, illustrating a preferred embodiment of the invention, FIG. 1 is a top plan view of a pile forming and discharging bale carrier in accordance with my invention, taken by itself and shown with parts broken away.

FIG. 2 is a rear end view of the carrier, illustrated as taken on a line 2—2 of FIGURE 1.

FIG. 3 is a side view of the carrier, shown broken away in part and partly in section, and illustrated as taken on a line 3—3 of FIGURE 1, and further shown with the bale supporting cradle raised.

FIG. 4 is a side view of the bale supporting cradle and mounting, shown with the cradle depressed in bale discharging position, and with the mounting for the carrier shown broken away.

FIG. 5 is an enlarged top view of the cradle lock, shown in attachment to the cradle mounting post, and also shown broken away in part.

FIG. 6 shows an end view of a pile of bales as they would appear when discharged on to the ground from the carrier cradle.

FIG. 7 is an enlarged perspective of the carrier and including the outlet frame portion of the baler, shown with the carrier broken away in part and with parts omitted.

FIG. 8 shows a detail plan view of a fragment of the pivotal mounting for the cradle.

FIG. 9 is a somewhat diagrammatical top plan view in part of the cradle mounting, illustrating the capacity of the cradle to swing sidewise.

Having reference to the drawings, at 1 and 2 are shown rear end uprights of the baler between which bales are discharged. For the purpose of the present invention these uprights carry cross bars 3 and 4, endwise slidably attached on the uprights by clamping plates 5.

On the lower cross bar 4 are lugs 6 in which is carried a rod 7, and on this rod is pivoted a yoke 9, the yoke including rear end lugs 10 engaging the rod 7 and a cross bar 11.

The supporting frame for the carrier cradle includes a post 12 fixed on a beam 13. On this post is fixed a buffer plate 14 braced to the yoke by braces 15. The plate 14 includes a lug 16 to which attaches a chain 17 that has its other end terminating in an attached bolt 18 that engages a U shaped lug 19 attached to the upper cross bar 3, the bolt permitting of adjustment of the level at which the carrier supporting frame is suspended.

The frame of the cradle on which the bales are assembled consists of a tubular frame bar 20 with forwardly projecting arms 21 that pivot on sleeves 22 on bolts 23 carried by arms 24 fixed to the carrier beam 13. To the ends of the cradle frame bar 20 are attached outer bale supporting arms 25 and 26, and intermediately mounted on the bar 20 is a ridge plate 27 of inverted V shape in cross section. This ridge plate is attached resting on the frame bar by angular brackets 28, one to each side, the brackets attaching at their forward ends to the sides of the ridge plate and at their rear ends to a cross plate 29 fixed to the under side of the ridge plate.

The cradle is normally held horizontally by a high tension spring 30 forwardly connecting by a link 31 to a lug 32 on the cross bar 11, and rearwardly by a hook 33 and cable 34 attaching to the ridge plate 27.

Additionally the cradle is supported from the post 12 by a locking attachment that includes a pair of side plates 35 attached by a pin 36 to a rod 12' free to turn in the post 12, and between which plates is mounted a roller 37 on a shaft 38. On the forward end of the ridge plate 27 is fixed an angular buffer plate 39 spaced in opposing relation to the buffer plate 14. The angular plate 39 has an upstanding lug 40 that is engageable behind the roller 37 to secure the cradle elevated in a horizontal position.

At the rear end of the ridge plate 27 is pivoted a trip plate 41 on a cross bar 41' fixed in the ridge plate, the trip plate including an end stop 42. On this trip plate is a slideway 43 in which is engageable a roller 44 on an arm 45 that pivotally attaches to a locking arm 46 fixed on a plate 47 (FIG. 5) on the side plates 35, the ridge plate 27 having a suitable opening for the locking arm to pass through.

There is also provided a bale guide comprising plates 48 and 49 on the bale supporting arms 25 and 26 between which and the ridge plate 27 the two lower bales 50 and 52 of a pile that includes a top bale 51 (FIG. 6) are to be carried.

For keeping the bales from upending in their passage from the baler to the cradle a pair of guide rods 53 and 54 are suspended above the cradle fixed to a cross rod 55 carried on a bar 56 on a rod 57 mounted to turn in ears 58 on the upper frame cross bar 3. The guide rods are held by a rod 59 slidable in a lug 60 on the bar 55, the rod 59 engaging a lug 61 on the lower cross bar 4.

On the rod 59 is a sleeve 62 engageable with the rod by a set screw 63 and with the lug 60 by a spring 64. The spring 64 exerts a downward pull on the guide rod that is limited by the sleeve 62 and permits the guide rod assembly to rise, pivoting on the cross bar 3. The position of the sleeve may be changed to vary the normal position of the guide rods. The guide rods include outwardly turned forward ends 65 to assist in directing the bales discharged from the baler, and they also include a diagonal brace rod 67.

There are also included end guide plates 66 on the cradle bar 20 inclining forward and adapted to align the bale ends of the lower bales as they slide on to the cradle.

In the use of the bale piler, bales discharged from the baler pass through the opening defined by the uprights 1 and 2, and the cross bars 3 and 4. For piling the bales on the carrier cradle the cradle is located off center relative to the baler outlet, as will be apparent by reference to FIGURE 1. The first bale will be discharged on to the ridge plate 27 and guide plate 49, falling lengthwise with a long edge downward, as shown in FIGURE 6, and prevented from upending by the guide rod 54.

The second bale falls between the ridge plate 27 and guide plate 48, directed in part by the first bale, and prevented from upending by the guide rod 53.

These two bales have their butts aligned by the end guide plates 66, the ends of the bales sliding down over these inclined plates.

The third bale slides back on the two lower bales. When this bale reaches the trip plate 41 it forces this plate back, and when the slideway 43 moves back so that the forward side against which the roller 44 bears is rearward of the vertical the roller slides down pulling the trip plate 41 all the way down and at the same time disengaging the locking bar 46 from the lug 40 and allowing the cradle to drop under weight of the bales. The bales then slide off in a pile, such as in FIGURE 6, and on release of the bales the cradle is drawn upward by the spring 30, which has been tensioned by the downward tilting movement of the cradle.

It might be noted, by reference to FIGURE 9, that the cradle may sway in relation to the yoke 9, this being permitted by the spacing of the buffer plates 14 and 39, so that a normal discharge of the bales in a pile can occur when turning without pulling the pile over sidewise.

Having thus particularly described and ascertained the nature of our said invention, what we claim and wish to secure by Letters Patent is:

1. In a bale piling carrier for attachment in following relation to a traveling baler, said carrier having a cradle for receiving the bales from the baler and discharging the bales in a pile on the ground, the cradle including a cross bar at its forward end and forwardly projecting arms fixed to the cross bar, and the baler including spaced uprights between which the bales are discharged; a yoke, means forwardly attaching the yoke to the baler uprights to pivot up and down thereon, a vertically disposed post rearwardly mounted in the yoke, a cross beam fixed to the lower end of the post extending transversely of the yoke, arms fixed to the cross beam extending forwardly adjoining the cradle arms, means pivotally connecting the cradle arms to adjoining cross beam arms for the cradle to pivot up and down thereon, and means rearwardly suspending the yoke from the baler uprights.

2. In a bale piling carrier for attachment in following relation to a traveling baler, said carrier having a cradle for receiving the bales from the baler and discharging the bales in a pile on the ground, the cradle having a cross bar at the forward end thereof and forwardly projecting arms fixed thereto, a yoke forwardly pivotally attachable to the baler, a post rearwardly mounted in the yoke, a cross beam carried by the post, means pivotally attaching the cradle cross bar to the cross beam for the cradle to pivot vertically thereon, said means comprising arms fixed forwardly projecting from the cross beam and pivotally connected at the forward ends to the forward ends of the cradle cross bar arms, means rearwardly supporting the yoke from the baler, and locking means engageable with the cradle when the cradle is in bale receiving position, said locking means including a buffer plate on the forward end of the cradle, an upstanding stud on the buffer plate, a rod mounted upstanding free to turn in the yoke post, side plates attached fixed to the rod, and a roller mounted between the side plates engageable with the stud.

3. In a bale carrier having a yoke and means for pivotally attaching the yoke to the baler and including a bale carrying cradle mounted rearwardly pivotally attached to the yoke to move between bale reciving and discharging positions, an upstanding post carried by the yoke, side plates mounted on the post rearwardly projecting, a roller carried by the side plates, an upstanding stud on the cradle with which the roller is engageable to hold the cradle in bale receiving position, and means automatically effecting release of the cradle stud from the roller by the top bale of a pile of bales in pyramid form discharged from the baler on to the cradle, said means comprising a locking arm fixed to the post side plates depending through the cradle, a trip arm pivotally mounted upstanding on the rear end of the cradle engageable by the top bale discharging on to the cradle to be pushed rearward, an arm connecting the lower end of the locking arm and the trip arm, said trip arm having a vertical rearward downwardly extending runway and the connecting arm having a roller engaged in said runway.

References Cited in the file of this patent

UNITED STATES PATENTS

| | | |
|---|---|---|
| 1,006,850 | Howard | Oct. 24, 1911 |
| 2,649,945 | McClellan | Aug. 25, 1953 |
| 2,740,250 | Olson et al. | Apr. 3, 1956 |
| 2,799,129 | Huntley | July 16, 1957 |
| 2,822,659 | Moore | Feb. 11, 1958 |

FOREIGN PATENTS

| | | |
|---|---|---|
| 732,088 | Great Britain | June 15, 1955 |